Figure 2:
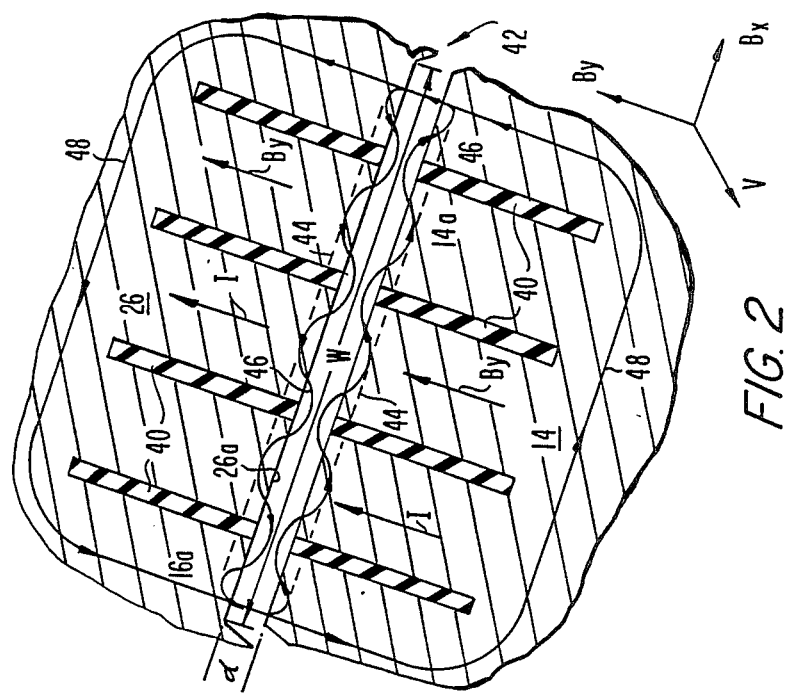

United States Patent [19]

Shah et al.

[11] Patent Number: 4,712,033

[45] Date of Patent: Dec. 8, 1987

[54] ACYCLIC GENERATOR WITH LIQUID METAL CURRENT COLLECTORS HAVING CIRCULATING CURRENT BARRIERS

[75] Inventors: Manoj R. Shah, Latham; Henry G. Lenz, Scotia, both of N.Y.

[73] Assignee: General Electric Company, Pittsfield, Mass.

[21] Appl. No.: 945,153

[22] Filed: Dec. 22, 1986

[51] Int. Cl.[4] .............................................. H02K 31/00
[52] U.S. Cl. ..................................... 310/178; 310/119
[58] Field of Search ................ 310/178, 219, 223, 251

[56] References Cited

U.S. PATENT DOCUMENTS

| 3,518,474 | 6/1970 | Rebut et al. | 310/178 |
| 4,041,337 | 8/1977 | Mole | 310/178 |
| 4,207,486 | 6/1980 | Hatch | 310/178 |
| 4,241,272 | 12/1980 | Marshall | 310/219 |
| 4,266,154 | 5/1981 | Marshall | 310/219 |
| 4,399,381 | 8/1983 | Chabrerie | 310/178 |
| 4,581,555 | 4/1986 | Kuznetsov et al. | 310/178 |

FOREIGN PATENT DOCUMENTS 2107937  5/1983  United Kingdom .

Primary Examiner—Patrick R. Salce
Assistant Examiner—D. L. Rebsch
Attorney, Agent, or Firm—Bailin L. Kuch; Robert C. Cahill

[57] ABSTRACT

Current barriers are incorporated in the liquid metal collector region of an acyclic generator to increase the impedance of the lossy circulating current paths therein, thereby to reduce circulating current magnitude.

11 Claims, 2 Drawing Figures

ACYCLIC GENERATOR WITH LIQUID METAL CURRENT COLLECTORS HAVING CIRCULATING CURRENT BARRIERS

BACKGROUND OF THE INVENTION

The present invention relates to dynamoelectric machines and particularly to acyclic (homopolar) generators utilizing liquid metal current collectors.

In acyclic (homopolar) generators the interaction of the component of the excitation magnetic field normal to the plane of the current collectors, i.e., aligned with the path of main generator current between stator and rotor, and the rotor peripheral velocity establishes a voltage which develops circulating currents in both solid brush and liquid metal current collectors. These circulating currents increase open circuit or no load losses by virtue of the resistive losses in the collector tip and brushgear. These circulating currents also produce additional electrical losses in the generator under load conditions by creating a non-uniform current distribution at the collector. The circulating current losses are proportional to the square of both the flux density of the normal magnetic field component and the collector tip velocity. In the case of liquid metal collectors, the additional resistive losses imposed by circulating currents raise the temperature of the liquid metal, and thus its rate of recirculation must be increased to limit this temperature rise to acceptable levels. Excessive liquid metal temperature raises its electrical resistivity and alters its mass density from that to which the structure for containing the liquid metal in the collector region against electromagnetic expulsion forces is normally designed.

A goal of present research and development efforts is to develop smaller, ultra-high current acyclic generators of dramatically increased power density. Increases in the magnetic flux density and/or peripheral velocity of the acyclic machinery are required to develop the necessary generator voltages. Liquid cooled copper armatures and compensating conductors are required to carry the ultra-high currents. This results in larger air gaps between the stator and rotor. The combination of increased flux densities and air gap dimension increases the magnitude of the fringing or leakage fields in the liquid metal collector region. All of these factors contribute to high power densities, as well as increased circulating currents and associated electrical losses in the liquid metal collector region of acyclic generators.

It is accordingly an object of the present invention to provide an acyclic generator having an improved liquid metal current collector.

A further object is to provide an acyclic generator of the above-character having reduced losses associated with the liquid metal current collectors.

A further object of the present invention is to provide an acyclic generator of the above-character wherein circulating currents in the liquid metal current collector region are reduced.

Other objects of the invention will in part be obvious and in part appear hereinafter.

SUMMARY OF THE INVENTION

In accordance with the present invention there is provided an acyclic or homopolar generator having improved liquid metal current collectors wherein the magnitude of circulating currents in the liquid metal collector regions is reduced. To this end, insulative current barriers are incorporated in the main generator current paths leading to and from the stator and rotor collector surfaces such as to increase the resistance of the circulating current paths. Since the induced driving voltage for these circulating currents is a function of the main magnetic excitation field component aligned with the main current path through the collector region and the rotor angular velocity, increasing the circulating current path resistance reduces the circulating current magnitude. Power loss occasioned by these circulating currents is advantageously also reduced.

More specifically, the current barriers are oriented in parallel relation to the main current path through the collector region and thus offer minimal interference to the main generator current. Moreover, the current barriers are arranged to effect interruptions in the continuity of the stator and rotor collector surfaces, thereby forcing a significant portion of the circulating currents into paths through the liquid metal occupying the gap between the stator and rotor collector surfaces. Since the liquid metal has a higher resistivity than the stator and rotor conductor parts of the collector region, circulating current path resistance is increased. Furthermore, the presence of the current barriers forces the circulating current paths through the stator and rotor conductor parts to be elongated, thus further increasing path resistance.

The invention accordingly comprises the features of construction, combination of elements and arrangement of parts which will be exemplified in the construction hereinafter set forth, and the scope of the invention will be indicated in the claims.

Figure 1:
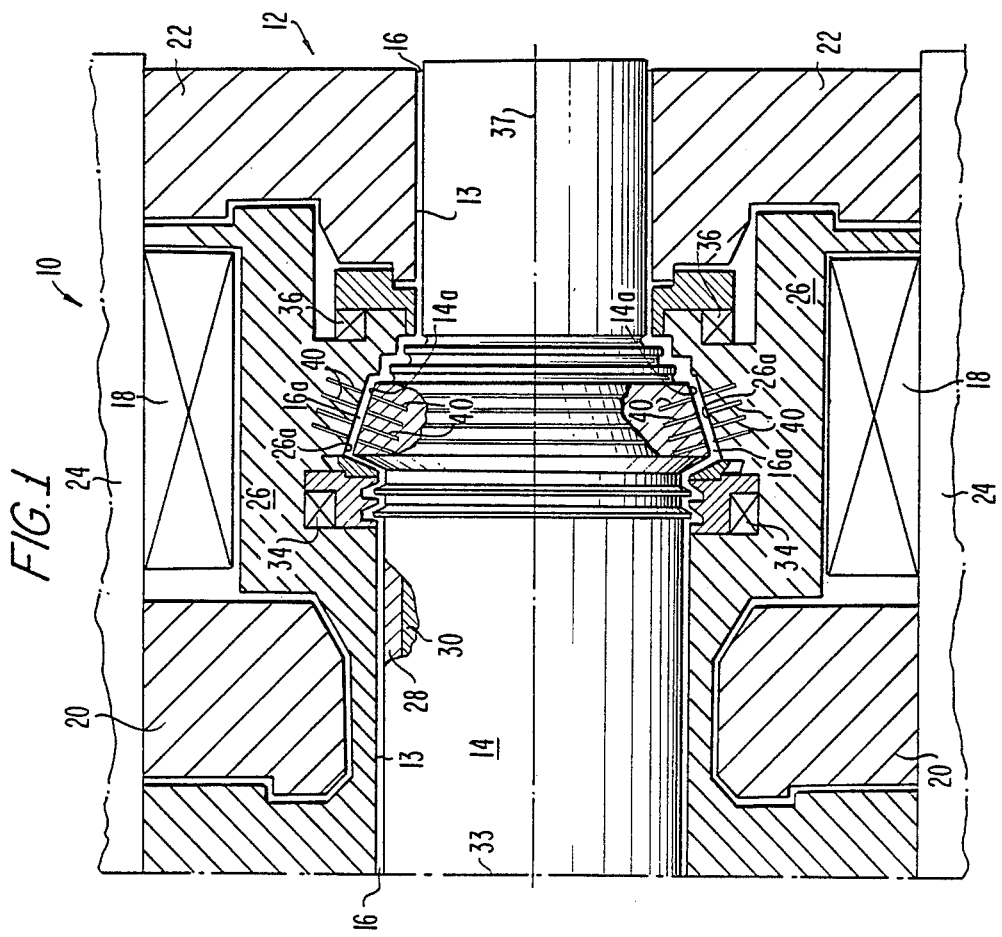

For a fuller understanding of the nature and objects of the invention, reference should be had to the following detailed description taken in conjunction with the accompanying drawings, in which:

FIG. 1 is a fragmentary side elevational view, partially in section, of an acyclic generator constructed in accordance with a preferred embodiment of the invention; and FIG. 2 is an enlarged, fragmentary sectional view of the collector region of the acyclic generator in FIG. 1 illustrating the unique circulating current paths imposed by the present invention.

DETAIL DESCRIPTION

Referring to FIG. 1, an acyclic or homopolar generator, generally indicated at 10, includes a stator, generally indicated at 12, having a bore 13 for accommodating a rotor 14 journalled for rotation by suitable bearings (not shown). The rotor and stator are separated by a clearance or air gap 16. Incorporated in stator 12 is a solenoidal-shaped main field winding 18 which is flanked on the left by an annular main polepiece 20 and on the right by an annular return polepiece 22. Coupling these polepieces in magnetic circuit is a cylindrical back iron member or yoke 24. Current energization of winding 18 establishes a main excitation field with flux established along paths including the pole pieces 20 and 22, yoke 24, and the portion of rotor 14 between these pole pieces.

To handle the high direct current delivered to a load connected across the generator terminals due to the voltage developed by the interaction of this main excitation field and the high velocity rotation of rotor 14, stator 12 incorporates an annular terminal member 26 of highly conductive metal such as copper. A segment of the inner diameter of this terminal member is machined to provide a conical stator collector surface 26a which cooperates with a complimenting conical rotor collector surface 14a to define an annular collector gap 16a therebetween. To provide an electrical connection between these conical collector surfaces, an electrically conductive liquid metal, such as a sodium-potassium eutectic (NaK), is conveyed by suitable means (not shown) to fill annular collector gap 16a. As in conventional practice, complimenting annular grooves, shoulders and land surfaces formed in the stator bore and on the rotor periphery to each side of stator-rotor collector surfaces serve to maintain the collector gap filled with liquid metal.

Except for the stator-rotor collector surfaces, the stator and rotor surfaces defining gap 16, particularly that portion of the stator bore 13 formed by terminal member 26, are coated with a suitable insulating material such as alumina. Thus, current transport between the stator and rotor is limited to a well defined collector region constituted by the stator collector surface 26a, the rotor collector surface 14a, and the liquid metal in gap 16a. To provide a high conductivity current path through the rotor, it is provided with an outer metallic sleeve 28, preferably of copper, surrounding a core 30 of magnetic steel. The main current path through the collector gap 16a is orthogonal to the parallel planes of the stator and rotor collector surfaces.

It will be appreciated that the above-described generator structure, as well as the structure described below, is replicated in mirror image to the left of centerline 33. In other words, the construction seen in FIG. 1 is symmetrical about this centerline.

As disclosed and claimed in commonly assigned co-pending application entitled "Magnetic Field Compensated Liquid Metal Current Collector for Acyclic Generator", Ser. No. 815,611 filed Jan. 2, 1986, a pair of solenoidal-shaped trim coils 34 and 36 may be incorporated in stator 12 in flanking relation to the collector region. These trim coils are energized to develop magnetic fields effective in cancelling at least a portion of the undesired excitation flux existing in the collector region. More importantly, the trim coil fields are of a character to significantly reduce the magnitude of that component of this excitation field in the collector region which is normal to the planes of the stator and rotor collector surfaces, i.e., parallel to the current path through gap 16a. Since it is this field component that is responsible for the generation of circulating currents in the liquid metal collector region, any reduction thereof mitigates the losses and thermal problems associated with such circulating currents. In other words, the trim coil fields in effect shape or compensate the excitation field existing in the collector region to more substantially align the leakage flux lines with the collector surface planes. Consequently, fewer flux lines penetrate these collector surfaces to set up circulating currents in the liquid metal collector medium. Thus, the length of collector gap 16a may be expanded for increased current carrying capacity without the penalties of increased losses and undue resistance heating of the liquid metal. Preferably, the trim coils are energized with equal and opposite direct currents such that the net magnetic field contribution to the main exciting field is practically zero.

To also contribute to reductions in the field component parallel to the main current path through the collector region, the collector surfaces may be angled relative to the generator axis 37, as illustrated, in order to more closely align the planes of the collector surfaces with the flux lines existing in the collector region.

While trim coils 34 and 36 are effective in reducing the component of the magnetic field in the collector region aligned with the main generator current path therethrough, total cancellation thereof is not readily achievable from a practical standpoint. This is particularly so for an iron core acyclic generator, such as disclosed in FIG. 1, in that the orientation of the leakage flux lines in the collector region typically changes with load conditions due to magnetic saturation effects. Thus, circulating currents in the collector region can not be totally eliminated under all load conditions. The present invention recognizes this fact and endeavors to reduce their magnitude by acting directly on the circulating current rather than on the magnetic fields giving rise to the circulating currents.

To this end, as seen in FIG. 1, a plurality of current barriers 40 are incorporated in the collector region to increase the impedance of the circulating current paths therein. In so doing, the circulating current magnitude is decreased, as is the power loss attributable thereto. This effect of the current barriers 40 is illustrated in FIG. 2, wherein the arrows I represent the main generator current path through the collector region, generally indicated at 42. Arrows $B_y$ represent that component of the magnetic field in the collector region aligned with the main current path therethrough, while arrow $B_x$ represents the field component parallel to the planes of the stator collector surface 26a and rotor collector surface 14a. The arrow V represents the rotational direction of rotor 14. The interaction of the rotor peripheral velocity and the field component $B_y$ produces a voltage differential across the width W of the collector region giving rise to circulating current. But for the presence of current barriers 40, this circulating current would flow generally in the loop path 44, indicated in dashed line, which, except for the short path segments transiting gap 16a through the liquid metal, is seen to be predominantly contained within the low resistivity metal conductor portions of the rotor and stator immediately adjacent to their collector surfaces. With the incorporation of the annular current barriers 40 distributed along the width W of the collector region 42, it is seen that the rotor and stator collectors are multiply interrupted or broken up into series of collector segments, with axially adjacent collector segments insulated from each other throughout the circumferences of the stator and rotor collector surfaces. Consequently, circulating currents are forced along the solid-line loop paths 46 and 48. It is seen that the circulating current in path 46 serpentines alternately through the collector segments and the liquid metal in gap 16a in order to circumvent the barriers 40. Since the resistivity of a typical liquid metal, such as a sodium-potassium eutectic (NaK), is approximately twenty times greater than that of the rotor and stator conductor material, typically copper, the impedance of path 46 is significantly greater than the impedance of path 44. In addition, by virtue of the radial extents of barriers 40, circulating current path 48 circumnavigating the radially innermost and radially outermost ends of these barriers is significantly elongated as compared to path 44, and thus is of considerably increased impedance. Since the power loss attributable to circulating current is directly proportional to the square of the current magnitude, and the induced circulating current driving voltage is a function of the rotor velocity and the magnetic field component $B_y$, which are unaffected by the presence of barriers 40, an increase in path resistance imposes a decrease in circulating current magnitude. Thus the improvement in power loss is directly proportional to the achieved decrease in circulating current magnitude.

It is important that the barriers 40 be aligned with the paths of the generator current I through the stator and rotor collector segments so as not to impede its paths through collector region 42. Thus, while the barriers in the stator and rotor are illustrated as being oriented in opposed, parallel relation, they may be skewed relative to each other where it is determined that the generator current does not follow a straight-line path through the collector region. The individual barriers should be of minimal thickness in order to avoid undue increase in the current density in the collector region, and yet not so thin that the circulating currents can arc between collector segments. The radial extent of the barrier should be sufficient to achieve the desired elongation of path 48 without unduly impeding the main generator current. It is apparent from FIG. 2 that the greater the number of barriers utilized, the greater the increase in circulating current path resistance. However, each barrier sacrifices conductor metal and thus increases generator current density in the collector region. While the incorporation of barriers 40 does allow some increase in the width W of the collector surfaces 14a, 26a, the number utilized is limited by current density considerations. While the optimum number and dimensions of the barriers are dependent on the specific acyclic generator design, by way of example, for collector surfaces one inch width, four barriers 40 may be incorporated in both the stator and rotor. Their radial depth may be one inch. To manufacture these barriers, annular grooves are created in the rotor and stator by suitable means, such as electrostatic discharge equipment. Epoxy resin may then be deposited in these grooves by a vacuum-pressure impregnation process.

While in the preferred embodiment of the present invention, barriers 40 are incorporated in both the stator and the rotor, it will be appreciated that beneficial reductions in circulating current magnitudes may be achieved by their incorporation in only one of these members. Also, while barriers 40 are illustrated as being implimented in combination with trim coils 34, 36, it will be appreciated that their efficacy in reducing circulating current magnitudes is independent of these field compensating coils and thus may be utilized independently.

It is thus seen that the objects set forth above, including those made apparent from the preceding description, are efficiently attained and, since certain changes may be made in the above construction without departing from the scope of the invention, it is intended that all matters contained in the above description or shown in the accompanying drawing shall be interpreted as illustrative and not in a limiting sense.

Having described the invention, what is claimed as new and desired to secure by Letter Patent is:

1. An acyclic dynamoelectric machine comprising, in combination:

A. a stator having a bore;

B. a rotor mounted for rotation about its axis within said bore and separated from said stator by an annular air gap;

C. a set of field windings for developing and excitation magnetic field;

D. a collector region including opposed, conforming annular collector surfaces of said rotor and said stator separated by a segment of said air gap, and liquid metal disposed within said air gap segment to conduct main current between said stator and said rotor collector surfaces; and E. a plurality of insulative current barriers incorporated in said collector region to interrupt the continuity of at least one of said collector surfaces at the interface thereof with said liquid metal, whereby to separate said main current into multiple parallel paths at said interface and to increase the resistance to circulating current in said collector region by forcing the circulating current in circumventing said insulative current barriers to flow in a serpentine path into and out of said liquid metal.

2. The acyclic dynamoelectric machine defined in claim 1, wherein said current barriers are substantially aligned with the path of main current through said collector region.

3. The acyclic dynamoelectric machine defined in claim 1, wherein said current barriers are of an annular configuration and are distributed along the width of said collector region.

4. The acyclic dynamoelectric machine defined in claim 2, wherein the dimension of said current barriers transverse to said path of main current is small relative to the dimension of said current barriers parallel to said main current path.

5. The acyclic dynamoelectric machine defined in claim 1, wherein said current barriers are incorporated in both said stator and said rotor to interrupt both said stator and rotor collector surfaces.

6. The acyclic dynamoelectric machine defined in claim 5, wherein said current barriers are of an annular configuration and are distributed along the widths of said stator and rotor collector surfaces.

7. The acyclic dynamoelectric machine defined in claim 6, wherein said current barriers are substantially aligned with the path of main current through said collector region.

8. The acyclic dynamoelectric machine defined in claim 7, wherein the dimension of said current barriers transverse to said path of main current is small relative to the dimension of said current barriers parallel to said main current path.

9. The acyclic dynamoelectric machine defined in claim 8, wherein said barriers are in the form of a narrow, relatively deep circumferential grooves created in the stator and rotor collector surfaces, said grooves being filled with an electrically insulative material.

10. The acyclic dynamoelectric machine defined in claim 8, which further includes field compensating means for reducing the component of said excitation magnetic field aligned with said main current path through said collector region.

11. The acyclic dynamoelectrical machine defined in claim 8, wherein said stator and rotor collector surfaces are each of a conical configuration.

* * * * *